(12) United States Patent
Kapur et al.

(10) Patent No.: US 11,651,373 B2
(45) Date of Patent: May 16, 2023

(54) EDGE-COMPUTING-BASED BOTTOM-UP HIERARCHICAL ARCHITECTURE FOR DATA ADMINISTRATION IN A DIGITAL NETWORK

(71) Applicant: Bank of America Corporation, Charlotte, NC (US)

(72) Inventors: Monika Kapur, Jacksonville, FL (US); Crystal M. Sundaramoorthy, Charlotte, NC (US); Kevin A. Delson, Woodland Hills, CA (US); Brandon Sloane, Charlotte, NC (US); Ryan Davis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 737 days.

(21) Appl. No.: 16/448,076

(22) Filed: Jun. 21, 2019

(65) Prior Publication Data

US 2020/0402059 A1    Dec. 24, 2020

(51) Int. Cl.
*G06Q 20/40*      (2012.01)
*G06F 16/18*      (2019.01)
(Continued)

(52) U.S. Cl.
CPC ..... *G06Q 20/4016* (2013.01); *G06F 16/1805* (2019.01); *H04L 9/0643* (2013.01); *H04L 67/01* (2022.05); *H04L 9/50* (2022.05)

(58) Field of Classification Search
CPC ............. G06Q 20/4016; G06Q 20/389; G06Q 20/223; G06F 16/1805; G06F 16/273;
(Continued)

(56) References Cited

U.S. PATENT DOCUMENTS 5,870,759 A *   2/1999   Bauer ................... G06F 16/273
8,243,596 B2     8/2012   Fedders et al.
(Continued)

OTHER PUBLICATIONS

Mary Shacklett, "Edge Computing: A Cheat Sheet," https://www.techrepublic.com/article/edge-computing-the-smart-persons-guide/, Jul. 21, 2017, 16 pp.
(Continued)

*Primary Examiner* — Marc S Somers
(74) *Attorney, Agent, or Firm* — Weiss & Arons LLP (57) ABSTRACT

A bottom-up hierarchical computer network architecture is provided. The architecture may include a central server. The architecture may also include a plurality of edge nodes that may be coupled to the central server. At least a first one of the edge nodes may be configured to process a transaction, compile data associated with the transaction, and store the data as a master dataset in the first edge node. The architecture may also include a data administration module. The data administration module may be configured to compare the master dataset in the first edge node to transactional data in the central server. When the transactional data in the central server is inconsistent with the master dataset in the first edge node, the data administration module may be configured to update the transactional data in the central server to be consistent with the master dataset in the first edge node.

16 Claims, 4 Drawing Sheets

(51) Int. Cl.
*H04L 9/06* (2006.01)
*H04L 67/01* (2022.01)
*H04L 9/00* (2022.01)

(58) Field of Classification Search
CPC ... G06F 16/2379; H04L 9/0643; H04L 67/42; H04L 2209/38
See application file for complete search history.

(56) References Cited

U.S. PATENT DOCUMENTS

| | | | |
|---|---|---|---|
| 8,244,874 B1 | 8/2012 | Thireault | |
| 9,900,725 B2 | 2/2018 | Young et al. | |
| 2006/0010150 A1* | 1/2006 | Shaath | G06F 16/125 707/999.102 |
| 2006/0136464 A1* | 6/2006 | Rossmann | G06F 16/289 707/999.102 |
| 2006/0225123 A1* | 10/2006 | Childress | G06F 21/57 726/1 |
| 2008/0255901 A1* | 10/2008 | Carroll | G06Q 30/0241 705/1.1 |
| 2016/0300069 A1* | 10/2016 | Anil | G06F 21/62 |
| 2018/0121891 A1 | 5/2018 | Hosny et al. | |
| 2018/0167445 A1 | 6/2018 | Speight et al. | |
| 2018/0367314 A1 | 12/2018 | Egner et al. | |
| 2019/0026450 A1 | 1/2019 | Egner et al. | |
| 2019/0207768 A1* | 7/2019 | Hardy | H04L 9/0897 |
| 2020/0137176 A1* | 4/2020 | Todd | H04L 67/10 |

OTHER PUBLICATIONS

Paul Miller, "What is Edge Computing?" https://www.theverge.com/circuitbreaker/2018/5/7/17327584/edge-computing-cloud-google, May 7, 2018, 7 pp.

"What is Edge Computing," https://www.ge.com/digital/blog/what-edge-computing, GE Digital, Retrieved on May 16, 2019, 7 pp.

* cited by examiner

EDGE-COMPUTING-BASED BOTTOM-UP HIERARCHICAL ARCHITECTURE FOR DATA ADMINISTRATION IN A DIGITAL NETWORK

FIELD OF TECHNOLOGY

Aspects of the disclosure relate to digital systems. Specifically, aspects of the disclosure relate to architectures for data administration in digital systems.

BACKGROUND OF THE DISCLOSURE

Many entities operate digital networks. Digital networks may include multiple node devices. Each node device may receive, generate, and/or transmit data. The data may be associated with the network.

The large amount of data accumulated (e.g., via the nodes) in the network can be taxing to the resources of the network. The resources may include memory, processing power, communication bandwidth, energy, and other suitable network resources.

Furthermore, accumulating data from disparate elements in the network (e.g., nodes, central servers, etc.) creates an environment that is vulnerable to duplicates and inconsistencies within the data.

It would be desirable, therefore, to provide systems and methods for data administration in digital networks. It would be further desirable, for the systems and methods to reduce resource utilization, and promote data consistency, across the network.

SUMMARY OF THE DISCLOSURE

Aspects of the disclosure relate to systems and methods for bottom-up hierarchical data administration in a computerized network. The computerized network may include a central server. The central server may be coupled to a plurality of edge nodes.

Methods may include compiling, via a first one of the edge nodes, data associated with a transaction. The methods may also include storing the data as a master dataset in a memory of the first edge node. The methods may further include comparing the master dataset to transactional data stored in the central server.

When the transactional data in the central server is inconsistent with the master dataset in the first edge node, the methods may include updating the transactional data in the central server to be consistent with the master dataset in the first edge node.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Aspects of the disclosure relate to systems and methods for edge-computing-based bottom-up hierarchical architectures for data administration in a digital network. Edge-computing as used herein refers to computing networks and environments that utilize elements, or nodes, at the logical edge of the network. The nodes may also have sufficient computational power to process the data at the logical edge of the network. The logical edge of a network may include portions of the network that are at, or close to, the interface with the environment outside of the network.

An edge-node may be a node on the periphery or edge of a network. An illustrative network may be an internet-of-things ("IoT") network. An IoT network may include one or more nodes. Each node may include two or more nodes.

A node may include, or may be, a sensor. A sensor may detect changes in attributes of a physical or virtual operating environment. For example, sensors may measure attributes such as audio, rainfall, movement, temperature, water levels, human activity, or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry, refrigerators, institutions, or any other suitable location. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may include, or may be, an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects.

For example, actuators may dim a light bulb, open a door, change a temperature setting, authorize access to an ATM and/or any other suitable functionality. Actuators may push notifications or redistribute resources. For example, notifications may route resources consumers (e.g., customers) to a location that has available resources to service the consumption.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data that was captured by other nodes far from the location where the data was generated. For example, captured data may be transmitted from one node to another node until the captured data reaches a centrally located data repository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

Communication protocols used by nodes may not have, or may not be capable of having, security capabilities. A security layer or buffer may be implemented by nodes that receive or rely on data captured by unsecured sensors. Nodes may be dynamically connected or disconnected from a group or consortium. A security layer or buffer may be modular and scalable meet network node growth/contraction requirements.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across an IoT network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Such nodes may move in or out of a network. Nodes within a geographic area may be grouped based on their presence within the geographic area. For example, nodes in and/or around a room, building, or institution, or a portion thereof, may form a group. Nodes may be grouped based on their expected trajectory. Nodes may be grouped based on whether they are resource consumer or providers. Nodes may be grouped based on expected resource consumption. Nodes may be grouped virtually. Grouped nodes may form a sub-network.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip (SoC) architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes" (alternatively, "edge nodes"). Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed in a windfarm turbine may detect changes in wind speed or wind direction. Typically, the sensor may transmit the detected changes to a remote cloud computing environment. The remote cloud computing environment may process data received from the node (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing exposure of such data to security threats.

For example, a network of security cameras (e.g., sensor nodes) may generate large amounts of video data. Transmitting such large amounts of data to a cloud computing environment may utilize significant bandwidth—possibly preventing the cloud computing environment from timely receiving other data. Edge-nodes may analyze the video data at the source, before transmitting the data to the cloud computing environment. The analysis by the edge-nodes may identify "important" video footage and discard the rest. Only the important video footage may be transmitted to the cloud computing environment, reducing network congestion.

Often, instructions to actuators need to be issued in milliseconds or faster. Round-trip communication to a cloud computing environment introduces undesirable latency. For some applications, necessary reliability and critical-path control management make it undesirable to wait for the cloud computing environment to process data and issue responsive instructions.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust communication infrastructure. Incorporating edge-nodes may allow networks associated with these industries to process data without robust communication infrastructure.

Smartphones may not have access to a data connection. Edge-nodes may allow a cached version of a website to be opened on a smartphone, without an internet connection. Data may be entered into the website and changes saved locally to the edge-node (e.g., the smartphone itself). The edge-node may sync changes with the cloud computing environment when a data connection is available. Aggregated sensor data may be transmitted to the cloud computing environment at designated times, such as when network bandwidth is underutilized.

Utilizing edge-nodes to process data may improve security of a network. For example, a network breach may be detected by an edge-node. The intrusion may be quarantined by or at the edge-node and prevent the breach from compromising the entire network.

Edge-nodes may run encryption algorithms and store biometric information locally. Such dispersion of security protocols may reduce the risk of any user's security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

An edge-node may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The data port may include a communication circuit. An edge-node may include a modem, antenna or other communication circuitry for establishing communications over a network, such as the Internet. The communication circuit may include the network interface or adapter. The communication circuit may include the modem.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

An edge-node may receive and/or transmit data in real-time or at pre-defined intervals, such as once a day. The edge-node may filter data captured by one or more nodes. The edge-node may repackage or reformat captured data.

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

A method for bottom-up hierarchical data administration in a computerized network is provided. A traditional hierarchical architecture may include an architecture with multiple tiers, and authority may increase with the higher tiers. Often, the higher tiers also contain fewer participants than the lower tiers. A bottom-up approach may include architectures where the participants in the lower tiers influence the participants of the higher tiers. The disclosed systems and methods may utilize a hybrid approach. Regarding many network tasks, e.g., permissions and control, the upper tiers may retain authority. Contrariwise, when it comes to data administration, authoritative structure may be inverted and the lower tiers may be prioritized.

The computerized network may include a central server. The central server may be coupled, directly or indirectly, to a plurality of edge nodes.

The method may include compiling, via a first one of the edge nodes, data associated with a transaction. The method may also include storing the data, or a relevant portion thereof, as a master dataset in a memory of the first edge node. Relevant portions may include predetermined categories. For example, for a transaction that is a sale, relevant portions may include the transacting parties, date, amount, etc.

The method may further include comparing the master dataset to transactional data stored in the central server. When the transactional data in the central server is inconsistent with the master dataset in the first edge node, the method may include updating the transactional data in the central server to be consistent with the master dataset in the first edge node.

In some embodiments, the method may further include storing, on each one of the plurality of edge nodes, a copy of the master dataset. The copy may be a full copy. The copy may be a partial copy, and may include only data that is predetermined to be relevant. The threshold for relevancy may be different between the first edge-node (i.e., the originator of the master dataset) and the rest of the edge-nodes. The copy may, in certain embodiments, include data generated by the other edge-nodes. For example, the first edge-node may execute a transaction and generate and store a master dataset. Other edge-nodes may generate their own versions of the master dataset based on their own perspectives of the same transaction via their own sensors.

In certain embodiments, storing the master dataset and the copies may be implemented as a distributed ledger. In a distributed ledger, multiple copies of a dataset may be stored separately on multiple computing devices, in this case the edge-nodes. The distributed ledger may be a blockchain database. The blockchain database may include a plurality of coordinated (i.e., synced via consensus) databases. Each coordinated database may be stored on a distinct blockchain node (i.e., a computing device that authenticates and stores a copy of the coordinated database) from a plurality of blockchain nodes. Each coordinated database may include linked blocks of hashed data. A block that is linked to a previous block may include a hashing of the hashed data of the previous block. In certain embodiments, the data may be encrypted. In other embodiments, the data may not be hashed or encrypted.

The blockchain may be a public blockchain. A public blockchain may be a blockchain in which anyone can participate. The blockchain may be private. A private blockchain may be a blockchain in which write permissions are exclusive to one entity, while read permissions may be public or restricted to certain participants.

In certain preferred embodiments, the blockchain may be semi-private. A semi-private blockchain may be run by a single entity, and the single entity may grant access to other qualifying entities. For example, the single entity may be a financial institution associated with the transaction. The other entities may be the edge-devices that are part of the network. Storing the copy on each one of the plurality of edge-nodes may include appending the copy to the distributed ledger on each one of the plurality of edge-nodes. Data updates may therefore be entered and/or authenticated directly by the edge-devices.

The method may, in certain embodiments, further include comparing the master dataset in the first edge node to the copies in the rest of the plurality of edge nodes. When the comparing determines an inconsistency, the method may include updating the master dataset in the first edge node and the copies in the rest of the plurality of edge nodes to be consistent and store the same dataset. The consistent dataset stored by all the nodes may be based on a consensus that is derived from said comparing. For example, a consensus may be a majority consensus, and the method may include updating the data in all the nodes to conform with the dataset that was stored in the majority of nodes at the time of the comparison.

In some embodiments, the method may further include deleting the transactional data in the central server when the transactional data is a duplicate of the master dataset.

In certain embodiments, the method may further include only deleting the transactional data in the central server when the transactional data is a duplicate of the master dataset, and qualifies to be part of a predetermined dispensable category. A dispensable category may include data that is not linked to other departments or uses. For example, for a transaction that is an upload of a signed document, the document may be needed for another transaction, or other suitable use. Such data may not be dispensable, and the duplicate data in the central server may not be deleted. By contrast, certain sales may be classified as dispensable, and the method may then include deleting duplicate data.

In some embodiments of the method, the first edge node may be a device that executed the transaction. Examples of transactions may include a sale, a trade, or a transfer, and/or a submission of documentation associated with a sale, a trade, or a transfer. The first edge node may, for example, be a point of sale ("POS") terminal, a phone or computing device that executes a transaction, or a scanning device that is configured to upload transaction documents.

A bottom-up hierarchical computer network architecture is provided. The architecture may include a central server. The central server may include a memory unit for storing transactional data.

The architecture may also include a plurality of edge nodes. The edge nodes may be coupled to the central server. Each edge node may include a processor and a memory unit.

At least a first of the edge nodes may be configured to process a transaction, compile data associated with the transaction, and store the data as a master dataset in the memory unit of the first edge node.

The architecture may also include a data administration module. The data administration module may be configured to compare the master dataset in the first edge node to the transactional data in the central server. When the transactional data in the central server is inconsistent with the master dataset in the first edge node, the data administration module may be configured to update the transactional data in the central server to be consistent with the master dataset in the first edge node.

In some embodiments of the architecture, the data administration module may be further configured to store a copy of the master dataset on each one of the plurality of edge nodes.

In certain embodiments, one of the plurality of edge nodes may be a part of a distributed ledger database. Storing the copy on each one of the plurality of edge nodes may include appending the copy to the distributed ledger on each one of the plurality of edge nodes.

In some embodiments of the architecture, the data administration module may be further configured to compare the master dataset in the first edge node to the copies in the rest of the plurality of edge nodes. When the comparison determines an inconsistency, the data administration module may be configured to update the master dataset in the first edge node and the copies in the rest of the plurality of edge nodes to be consistent based on a consensus derived from said comparison.

In certain embodiments of the architecture, the data administration module may be further configured to delete the transactional data in the central server when the transactional data is a duplicate of the master dataset.

In some embodiments of the architecture, the data administration module may be further configured to only delete the transactional data in the central server when the transactional data is a duplicate of the master dataset, and also qualifies to be part of a predetermined dispensable category.

The first edge node may, in certain embodiments, be further configured to execute the transaction. Exemplary transactions may include a sale, a trade, or a transfer, and/or a submission of documentation associated with a sale, a trade, or a transfer. When the first edge node executes a transaction, it may be in a position to process, compile data, and store the master dataset for the transaction. In other embodiments, the first edge node may be in a position to process, compile data, and store the master dataset for a transaction by observing the transaction. The observation may be enabled by being physically proximal to, or within sensor range of, the transaction.

A computer system with bottom-up hierarchical data administration is provided. The system may include a central server. The central server may include a memory unit for storing transactional data. The system may include a plurality of edge nodes. The edge nodes may be coupled to the central server. Each edge node may include a processor and a memory unit.

At least a first of the edge nodes may be configured to process a transaction, compile data associated with the transaction, and store the data as a master dataset in the memory unit of said first edge node.

The system may include a data administration module. The data administration module may be configured to compare the master dataset in the first edge node to the transactional data in the central server. When the transactional data is a duplicate of the master dataset, and the transactional data qualifies to be part of a predetermined dispensable category, the data administration module may be configured to delete the transactional data in the central server.

In some embodiments of the system, each one of the plurality of edge nodes may be a part of a distributed ledger database. The data administration module may be further configured to store a copy of the master dataset on each one of the plurality of edge nodes. Storing the copy on each one of the plurality of edge nodes may include appending the copy to the distributed ledger on each one of the plurality of edge nodes.

The data administration module may be further configured to compare the master dataset in the first edge node to the copies in the rest of the plurality of edge nodes. When the comparison determines an inconsistency, the data administration module may be further configured to update the master dataset in the first edge node and the copies in the rest of the plurality of edge nodes to be consistent based on a consensus derived from the comparison.

In some embodiments of the system, the data administration module may be further configured to update the transactional data in the central server to be consistent with the master dataset in the first edge node. The update may be executed when the comparison determines that the transactional data in the central server is inconsistent with the master dataset in the first edge node.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
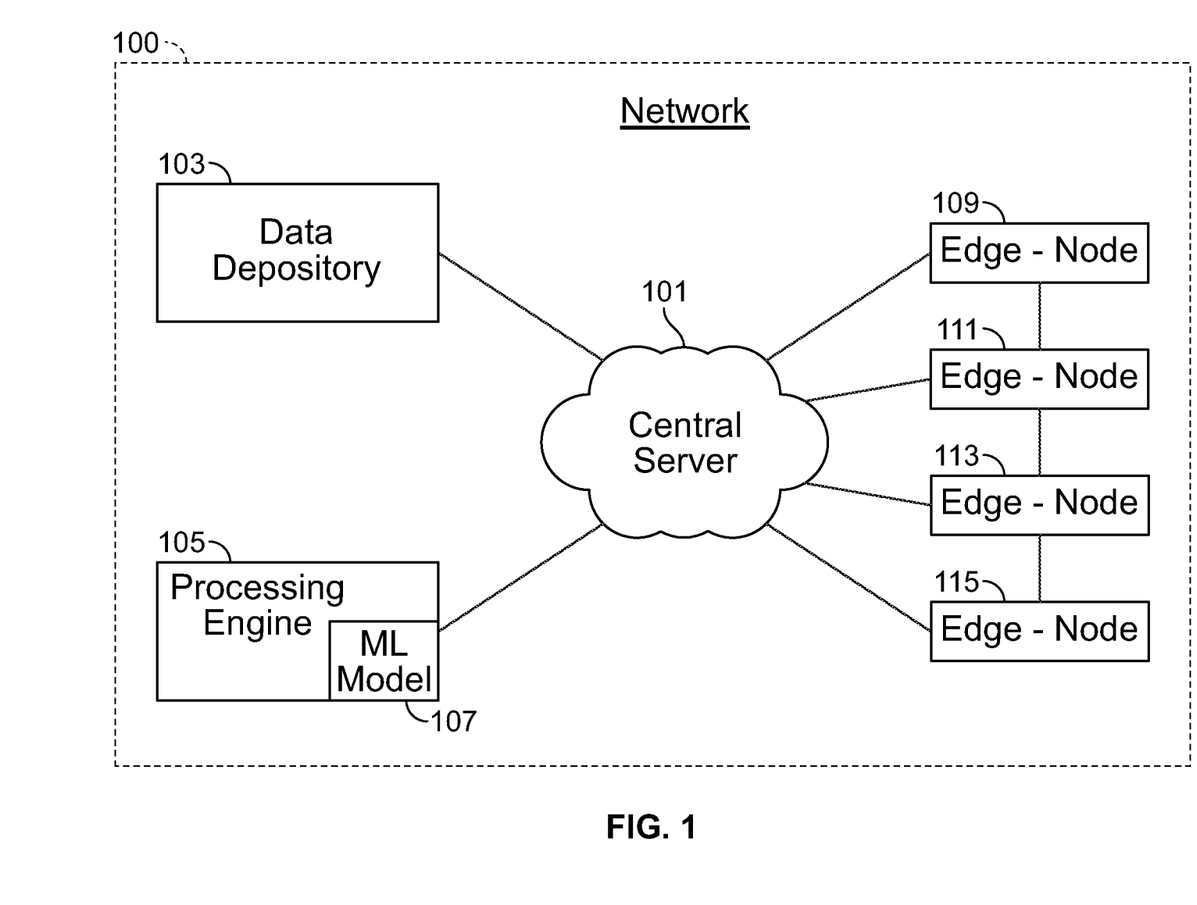
FIG. 1 shows an illustrative network architecture in accordance with principles of the disclosure.

FIG. 1 shows illustrative network architecture 100 according to aspects of the disclosure. Architecture 100 may include a central server 101. Central server 101 may be coupled with data depository 103 (alternatively referred to as a data repository). Central server 101 may be coupled with processing engine 105. Processing engine 105 may be operable with machine-learning ("ML") model 107.

Some or all of architecture elements 101-107 may be physically located in a central location. Some or all of architecture elements 101-107 may be logically centralized. Some or all of architecture elements 101-107 may be cloud-based.

Architecture 100 may include edge-nodes 109-115. Edge-nodes 109-115 may be devices at the network edge—i.e., devices at or near the interface with the environment outside of the network. Edge-nodes 109-115 may be devices that are capable of generating, processing, and storing data at the edge, without relying on central server 101. Each of edge-nodes 109-115 may include a sensor, a processor, and a memory.

Figure 2:
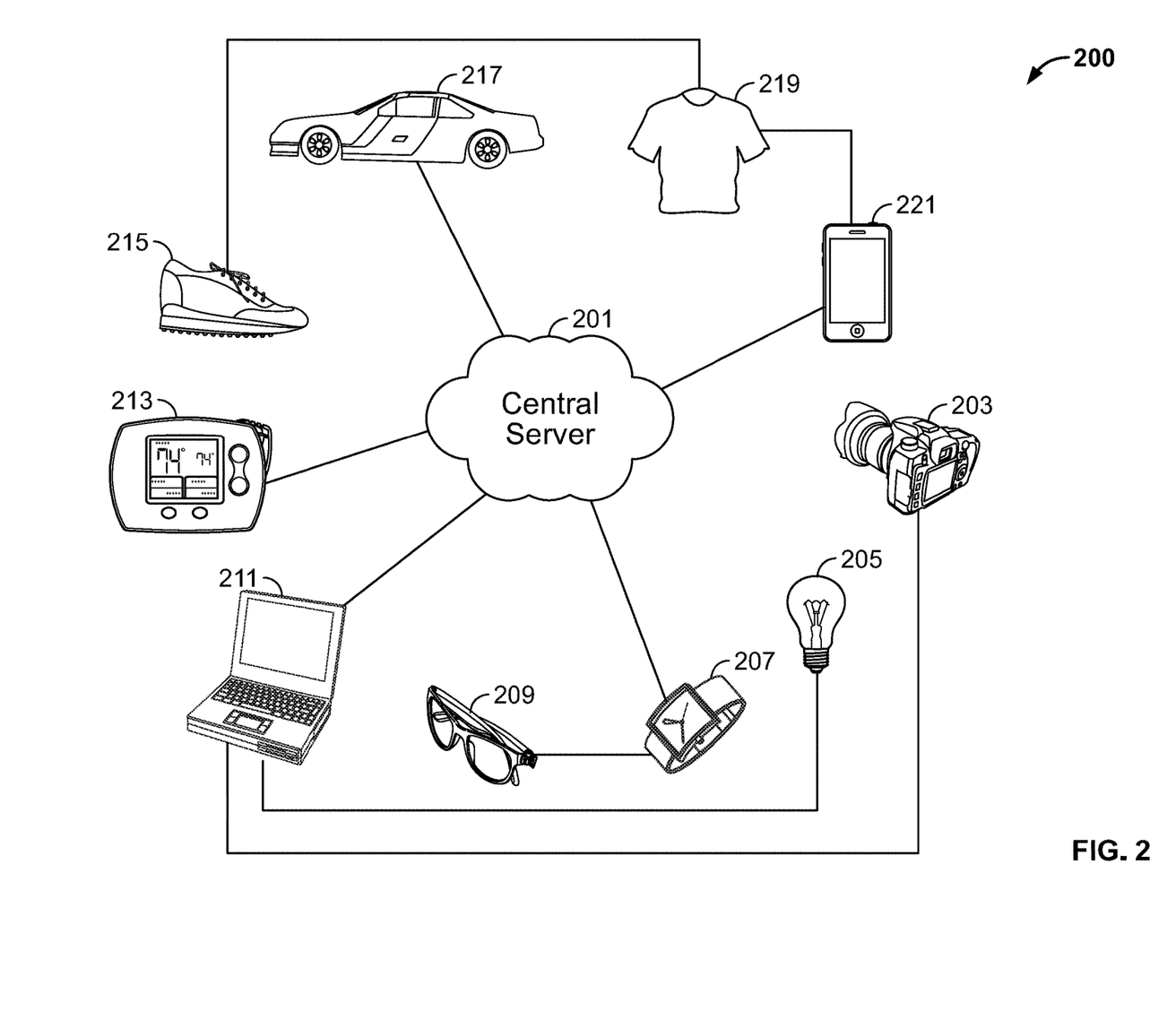
FIG. 2 shows another illustrative network architecture in accordance with principles of the disclosure.

FIG. 2 shows illustrative network architecture 200 according to aspects of the disclosure. Architecture 200 may include a central server 201. In some embodiments, architecture 200 may be a distributed network and may not include distinct central components.

Architecture 200 may include edge-nodes 203-221. Edge-nodes 203-221 may include a video camera, light bulb, smart watch, smart glasses, computer (e.g., laptop, desktop, tablet), smart thermostat, shoe, car, shirt, and smartphone, respectively. Each of edge-nodes 203-221 may include at least a sensor, a processor, and a memory. Each of edge-nodes 203-221 may be configured to communicate with other devices. Some of the nodes may communicate with the central server directly. Others may communicate with intermediate devices (intermediate devices may be referred to alternatively as edge servers) that may or may not then communicate with the central server. Architecture 200 shows connecting lines between edge-nodes 203-221 to show illustrative connective routes. For example, architecture 200 shows that while car 217 and computer 211 may be configured to communicate directly with central server 201, video camera 203 and light bulb 205 may be configured to communicate with the network via computer 211.

Figure 3:
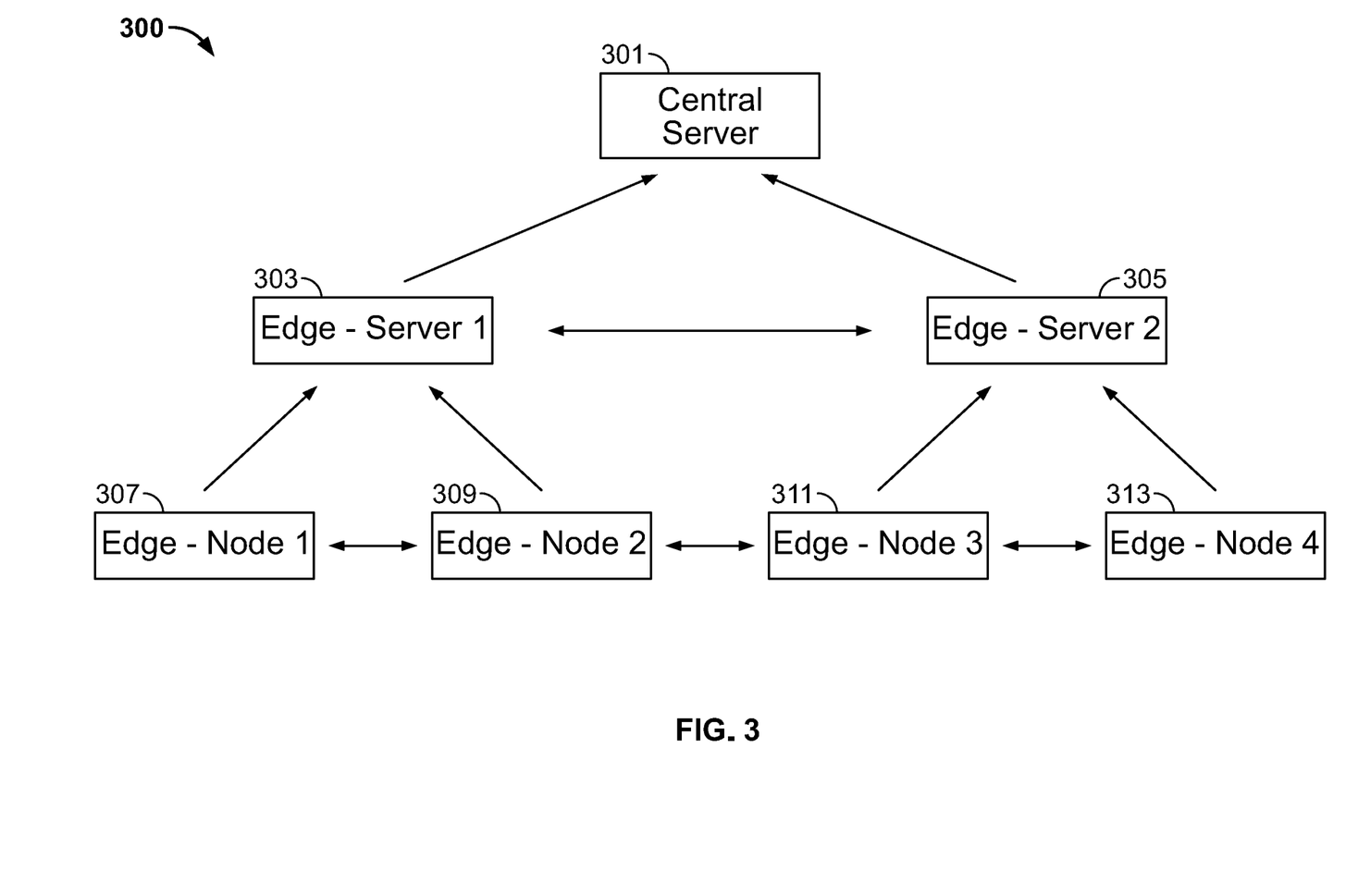
FIG. 3 shows an illustrative bottom-up hierarchical architecture in accordance with principles of the disclosure.

FIG. 3 shows illustrative bottom-up hierarchical architecture 300 according to aspects of the disclosure. Architecture 300 may include central server 301. Central server 301 may be depicted at the top tier of the hierarchy. In many respects, central server 301 may have authoritative status over the devices in the lower tiers. Lower tiers may include edge-server 303 and edge-server 305 in an intermediate tier, and edge-nodes 307-313 in a bottom tier. However, regarding data administration, authority may be reversed, and the lower tiers may have greater authority than the higher tiers.

Figure 4:
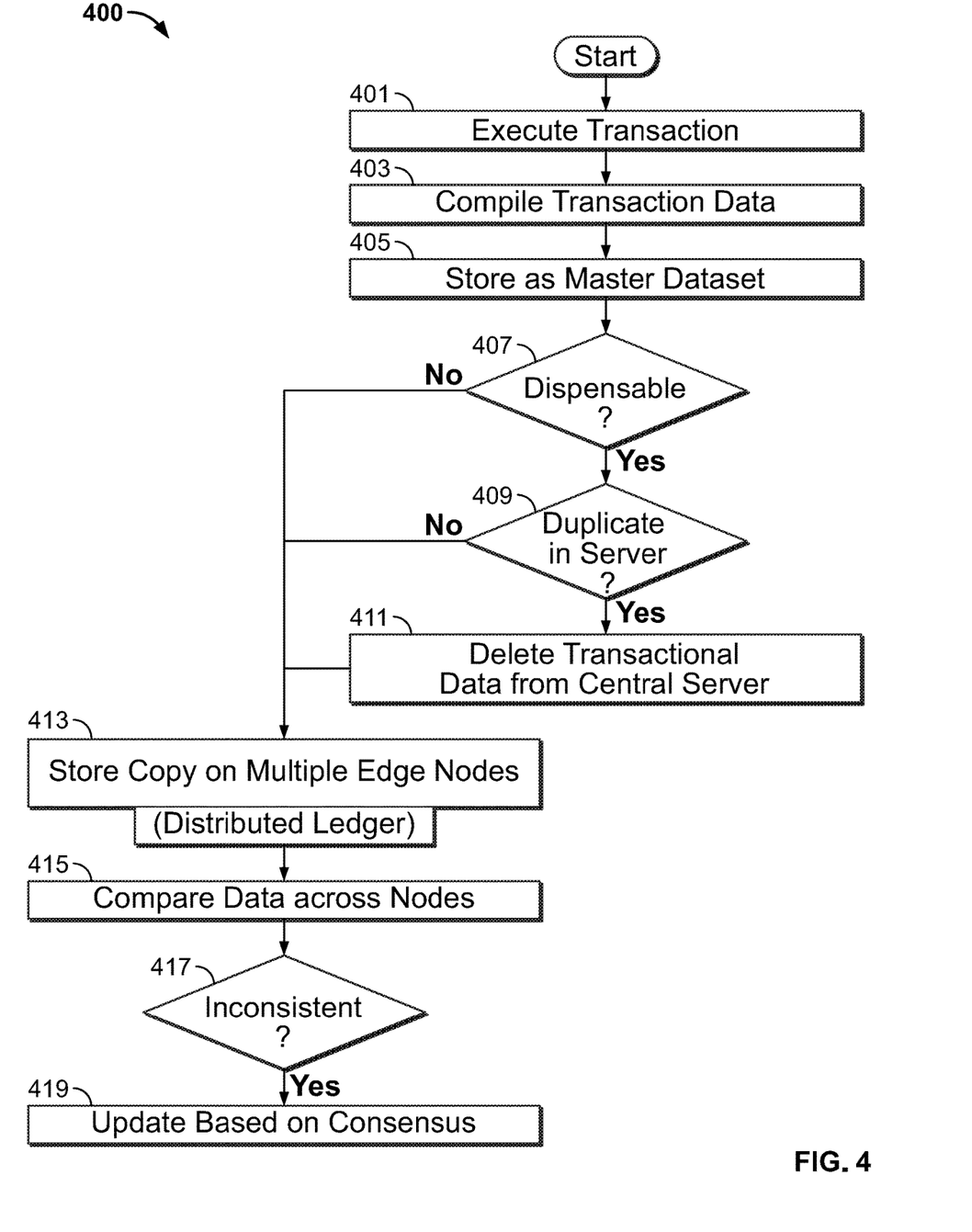
FIG. 4 shows an illustrative flowchart in accordance with principles of the disclosure.

FIG. 4 shows illustrative flowchart 400 of a logical flow according to aspects of the disclosure. Flowchart 400 may represent one exemplary embodiment—other embodiments may include different logical steps and/or step sequences than those shown in flowchart 400.

Flowchart 400 may begin with executing a transaction at step 401. The transaction may, for example, be a sale executed by an edge-device, such as a POS terminal. The edge device may compile transaction data at step 403, and store the data as a master dataset at step 405. If the data is not determined to be dispensable at step 407, i.e., the data may be needed by other elements of the network, the flowchart proceeds to step 413. If the data is determined to be dispensable at step 407, i.e., the data should not be needed by other elements of the network, the flowchart proceeds to step 409, where the system checks for duplicates in the central server. If no duplicate is found, the flowchart proceeds to step 413. If a duplicate is found, the duplicate may be deleted from the transactional data stored in the central server at step 411.

Step 413 may include storing copies of the master dataset on multiple edge-nodes. Storing the copies may be implemented as a distributed ledger. The copies may be received from the edge-device that executed the transaction. Alternatively, the copies may be generated independently by the other edge-devices, e.g., based on their sensor perspective of the transaction.

Step 415 may include comparing the data across the nodes. If an inconsistency is determined at step 417, the datasets may be updated based on a consensus derived from the comparing.

Thus, systems and methods are provided for a bottom-up hierarchical architecture for data administration in a digital network. Advantages of the unique architecture include providing consensus-backed authentication for the data located at the network edge, as well as giving the edge-data higher authority over the data at the typically authoritative central network.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for edge-computing-based bottom-up hierarchical architecture for data administration in a digital network are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for bottom-up hierarchical data administration in a computerized network, said computerized network comprising a central server coupled to a plurality of edge nodes, the method comprising:
    providing the central server with authority over the plurality of edge nodes regarding permissions and control in the computerized network;
    compiling, via a first one of the edge nodes, data associated with a transaction;
    storing the data as a master dataset in a memory of the first edge node;
    comparing the master dataset to transactional data stored in the central server; and
    when the transactional data in the central server is inconsistent with the master dataset in the first edge node, updating the transactional data in the central server to be consistent with the master dataset in the first edge node even though the central server has authority over the first edge node regarding permissions and control in the computerized network;
    wherein:
    the method further comprises deleting the transactional data in the central server when the transactional data is a duplicate of the master dataset, wherein said deleting is only performed when the transactional data:
    is a duplicate of the master dataset; and
    qualifies to be part of a predetermined dispensable category; and
    transactional data that is associated with one transactional classification and disassociated with any other transactional classification is categorized as a predetermined dispensable category.

2. The method of claim 1, further comprising storing a copy of the master dataset on each one of the plurality of edge nodes.

3. The method of claim 2, wherein each one of the plurality of edge nodes is a part of a distributed ledger database, and the storing the copy on each one of the plurality of edge nodes comprises appending the copy to the distributed ledger on each one of the plurality of edge nodes.

4. The method of claim 2, further comprising:
    comparing the master dataset in the first edge node to the copies in the rest of the plurality of edge nodes; and
    when the comparing determines an inconsistency, updating the master dataset in the first edge node and the copies in the rest of the plurality of edge nodes to be consistent based on a consensus derived from said comparing.

5. The method of claim 1, wherein the first edge node is a point of sale ("POS") terminal that executed the transaction.

6. The method of claim 1, wherein the transaction is a sale, a trade, or a transfer, and/or a submission of documentation associated with a sale, a trade, or a transfer.

7. A bottom-up hierarchical computer network architecture, said architecture comprising:
- a central server, said central server comprising a memory unit for storing transactional data;
- a plurality of edge nodes coupled to the central server, each edge node comprising a processor and a memory unit, wherein the central server has authority over the plurality of edge nodes regarding permissions and control in the network and at least a first of the edge nodes is configured to:
  - process a transaction;
  - compile data associated with the transaction; and
  - store the data as a master dataset in the memory unit of said first edge node; and
- a data administration module, said data administration module configured to:
  - compare the master dataset in the first edge node to the transactional data in the central server; and
  - when the transactional data in the central server is inconsistent with the master dataset in the first edge node, update the transactional data in the central server to be consistent with the master dataset in the first edge node even though the central server has authority over the first edge node regarding permissions and control in the network;

wherein:
the data administration module is further configured to delete the transactional data in the central server when the transactional data is a duplicate of the master dataset, wherein said deleting is only performed when the transactional data:
- is a duplucate of the master dataset; and
- qualifies to be part of a predetermined dispensable category; and transactional data that is associated with one transactional classification and disassociated with any other transactional classification is categorized as a predetermined dispensable category.

8. The architecture of claim 7, Wherein the data administration module is further configured to store a copy of the master dataset on each one of the plurality of edge nodes.

9. The architecture of claim 8, wherein each one of the plurality of edge nodes is a part of a distributed ledger database, and storing the copy on each one of the plurality of edge nodes comprises appending the copy to the distributed ledger on each one of the plurality of edge nodes.

10. The architecture of claim 8, wherein the data administration module is further configured to:
- compare the master dataset in the first edge node to the copies in the rest of the plurality of edge nodes; and
- when the comparison determines an inconsistency, update the master dataset in the first edge node and the copies in the rest of the plurality of edge nodes to be consistent based on a consensus derived from said comparison.

11. The architecture of claim 7, wherein the first edge node is further configured to execute the transaction.

12. The architecture of claim 7, wherein the transaction is a sale, a trade, or a transfer, and/or a submission of documentation associated with a sale, a trade, or a transfer.

13. A computer system with bottom-up hierarchical data administration, said system comprising:
- a central server, said central server comprising a memory unit for storing transactional data;
- a plurality of edge nodes coupled to the central server, each edge node comprising a processor and a memory unit, wherein the central server has authority over the plurality of edge nodes regarding permissions and control in the system and at least a first of the edge nodes is configured to:
  - process a transaction;
  - compile data associated with the transaction; and
  - store the data as a master dataset in the memory unit of said first edge node; and
- a data administration module, said data administration module configured to:
  - compare the master dataset in the first edge node to the transactional data in the central server; and
  - when the transactional data is a duplicate of the master dataset, and the transactional data qualifies to be part of a predetermined dispensable category, delete the transactional data in the central server even though the central server has authority over the first edge node regarding permissions and control in the system;

wherein:
transactional data that is associated with one transactional classification and disassociated with any other transactional classification is categorized as a predetermined dispensable category.

14. The system of claim 13, wherein:
each one of the plurality of edge nodes is a part of a distributed ledger database; and the data administration module is further configured to:
- store a copy of the master dataset on each one of the plurality of edge nodes, wherein said storing the copy on each one of the plurality of edge nodes comprises appending the copy to the distributed ledger on each one of the plurality of edge nodes;
- compare the master dataset in the first edge node to the copies in the rest of the plurality of edge nodes; and
- when the comparison determines an inconsistency, update the master dataset in the first edge node and the copies in the rest of the plurality of edge nodes to be consistent based on a consensus derived from said comparison.

15. The system of claim 13, wherein the data administration module is further configured to update the transactional data in the central server to be consistent with the master dataset in the first edge node when the comparison determines that the transactional data in the central server is inconsistent with the master dataset in the first edge node.

16. The system of claim 13, wherein the first edge node is further configured to execute the transaction, and the transaction is a sale, a trade, or a transfer, and/or a submission of documentation associated with a sale, a trade, or a transfer.

* * * * *